United States Patent [19]
Kemper

[11] 3,874,495
[45] Apr. 1, 1975

[54] TRANSPORT DEVICE

[76] Inventor: Kate Kemper, Wybuelstrasse 6, Zurich-Zollikon, Switzerland CH-8702

[22] Filed: Jan. 22, 1973

[21] Appl. No.: 325,340

[30] Foreign Application Priority Data
Oct. 9, 1972 Germany............................ 2249383

[52] U.S. Cl.................................. 198/137, 198/155
[51] Int. Cl.............................................. B65g 17/00
[58] Field of Search........... 198/137, 138, 154, 155, 198/158, 38, 146, 230, 145, 141; 214/701 R, 214/701 P, 707, 708, 709

[56] References Cited
UNITED STATES PATENTS
| | | | |
|---|---|---|---|
| 2,704,177 | 3/1955 | Neaves.................................. | 198/146 |
| 2,855,094 | 10/1958 | Zebarth ............................. | 198/230 |
| 3,515,261 | 6/1970 | Before et al. ....................... | 198/155 |

Primary Examiner—Richard A. Schacher
Assistant Examiner—Joseph E. Valenza
Attorney, Agent, or Firm—McGlew and Tuttle

[57] ABSTRACT

A dough dividing and circular kneading device is spaced longitudinally from a dough rolling-out station with conveyor means carrying kneaded dough pieces from the dividing and kneading device to the rolling out-station. An endless conveyor extends between the rolling out-station and the kneading device, and has carrier elements thereon tiltable about respective pivot axes spaced longitudinally of the conveyor and extending transversely of the direction of movement of the conveyor, the carrier elements being arranged to received rolled-out dough pieces at the rolling-out station. Tray means are movable transversely of the conveyor beneath a run thereof to receive the rolled-out dough pieces, and guide rail means are operatively associated with the carrier elements and normally maintain the latter in dough-piece receiving orientation. A portion or section of the guide means is displaceable to tilt the carrier elements to discharge the rolled-out dough pieces onto the tray means. Release means are provided and are operable, each time a selected number of filled carrier elements is aligned with the tray means, to displace the rail guide means portion to so tilt the selected number of filled carrier elements to discharge the dough pieces therefrom onto the tray means.

13 Claims, 8 Drawing Figures

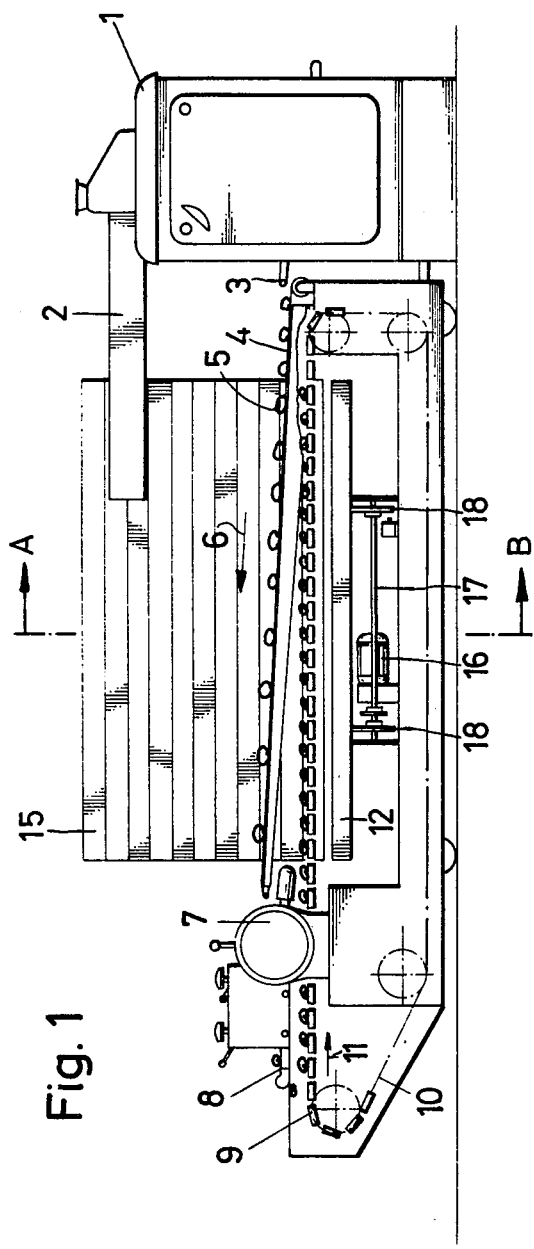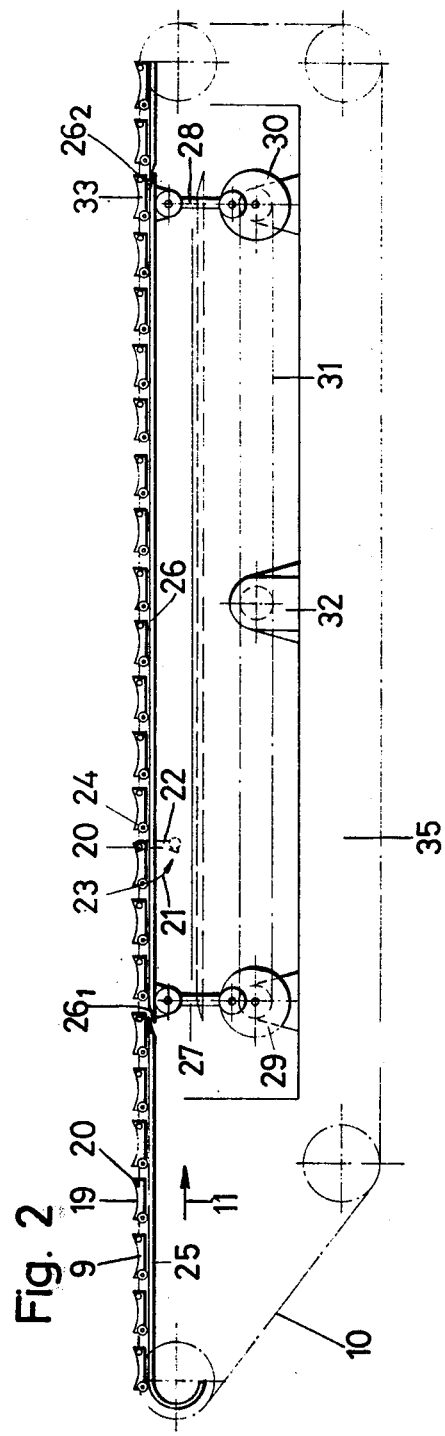

TRANSPORT DEVICE

FIELD AND BACKGROUND OF THE INVENTION

The invention relates to a transport device suitable for a compact, combined dough dividing and circular kneading device, which may be equipped with a rolling-out station for pieces of dough, if necessary.

A plant is already known, which comprises a dough dividing and circular kneading device, to which a dough mass is fed, which delivers the circularly kneaded pieces of dough to an expanding conveyor belt, to which is connected a rolling-out station with a folding device or which brings the pieces of dough directly for charging. Such combined dough dividing and circular kneading devices particularly serve for the production of small loaves, such as, say, rolls or French rolls, so that this equipment is on the market also under the name "roll production line."

After the pieces of dough have passed through the rolling station and the folding device, the pieces are laid down with their roll junctions or joints toward the bottom or one end, such as in the case of moulded pieces, on to fermented material carriers, which, for example, can have rockers. These fermented material carriers are then fed to a fermentation chamber and after that to a baking oven, in which the small loaves are ejected with the roll junctions or joints upwards on to a hearth surface.

In the construction and design of such equipment, efforts are made to find solutions which permit such devices to be operated be a single person. In this case it must be taken into account that the fermented material carriers to be used correspond substantially to the length of the baking hearth used, which is thus predetermined and usually amounts to about 160 cm with a width of 60 cm. A rocker carrier, which is charged with dough goods, of this size can no longer be manipulated by a single person, if no special measures are taken.

In order to solve this problem it is known inter alia to use rocker carriers which, for example, correspond to half the baking hearth length and which are assembled in an introducing frame before their introduction into the baking oven. These so-called introduction frames are then introduced, with the rocker carrier, into the baking oven. However, since all the rockers have to be actuated, it is necessary to make provision for central actuation from the outer end of the introducing frame.

To solve this problem it is already known, from the German patent specification 1,200,766, to arrange in front of and behind a dough dividing and kneading machine, in each case, a feed and a removal magazine in the form of a fermentation or baking board stacking device. In the case of the size of the fermented material carrier or of the fermentation or baking boards given above, it is easy to see that, particularly in the case of the additional use of a rolling-out station, the entire equipment takes up a length which is either not available in all bakeries or which prevents, to a large extent, other work in the bakery.

SUMMARY OF THE INVENTION

The present invention therefore seeks to provide a transport device suitable for a combined dough dividing and circular kneading device with a rolling-out station for pieces of dough, which device can operate independently of the operational rhythm of an operator and which can exploit the associated individual device components to the maximum extent. The invention further seeks to provide, in a particular embodiment thereof, a combined dough dividing and circular kneading device, which, if necessary, is provided with a rolling-out station and is equipped with a feed magazine and a removal device or a removal magazine, the length of the entire equipment not having to be substantially greater than the outer distance between the dough dividing and circular kneading device as well as of the rolling-out station, so that a compact plant can result.

According to the invention, there is provided, in a transport device for transporting dough pieces a carrier comprising on endless conveyor to which are secured transport or carrier elements for carrying dough pieces, where longitudinal axes are parallel to each other and transverse to the conveying direction and which are swivelable or tiltable about their longitudinal axes between a dough piece retaining position and a dough piece ejection position and release means acting simuiltaneously an a plurality of the transport or carrier elements to swivel them about their longitudinal axes for ejecting any dough pieces therin on to a carrier positioned therebeneath.

The endless conveyor may comprise, in an advantageous manner, two synchronously traveling belts or chains which are arranged parallel to each other, and which are connected by the transport elements lying in parallel with each other. The transport or carrying elements for taking up the pieces of dough may be provided with a concavely arched upper surface or be constructed in a trough-like manner. The transport or carrying elements may in this case, in an advantageous manner, be constructed as small rocker troughs which are swivellably or tiltably supported about a longitudinal axis.

An axle lying parallel to the swivel axis of the transport or carrying elements is preferably provided with a control guide for supporting and executing a tilting movement. The control guide may be, in this case, constructed, in the region above the carriers in the form of charging or fermented material carriers located between a rolling-out station and a dough dividing and circular kneading device, to be movable in such a manner that the transport or carrying elements, in each case, can execute a swivelling movement about their swivel axles at predetermined positions. The control guide may be constructed to be simultaneously adjustable in height with respect to the whole region above the charging or fermented material carriers.

The axle which lies parallel to the swivel axis may be provided at its ends with rollers which are appropriately guided by a pair of rails. The section of the pair of rails located in the region above the charging or fermented material carriers may be constructed to be capable of being automatically lowered and raised again at predetermined times. An automatic emptying of the transport or carrier elements and filling of the fermented material carriers located therebelow may be possible thereby, the pieces of dough occupying a defined position during transfer. The end sequence is optional in this case, according to the charging device used. This is necessary so that the roll joints or junctions of the pieces of dough comes to lie in the baking oven facing upwards. The lowering and raising movement of the section of the pair of rails may be effected by a plurality of rods, which are actuable in each case by an eccentric disc. All the eccentric discs of the equipment in this case may be connected non-positively to a drive, which is actuable at predetermined times in dependence on the operational speed of the dough divider and circular kneading device. The drive of the eccentric discs may be released in an advantageous manner by certain transport or carrier elements by means of correspondingly arranged actuating elements. With this it can be ensured that a transfer of the pieces of dough is effected only if the transport or carrier elements have taken up their correct position with respect to the fermented material carrier located therebelow.

It may be sufficient to arrange the control guide, for supporting and carrying out a tilting movement of the transport or carrier elements, merely in the upper run of the endless conveyor, which runs approximately horizontally. With this it can be achieved that the transport or carrier elements, in the regions which are not provided with a control guide, are moved in their empty state so that a corresponding treatment of the carrier elements is made possible.

In the lower run of the endless conveyor, which runs approximately horizontally, may be arranged, in an advantageous manner, an air-treatment chamber through which the transport or carrier elements pass so that the latter can be exposed to air cleaning and drying.

The above-described form of embodiment of the invention, however, still has an unimportant disadvantage in that the pieces of dough which are located on the carrier elements can disengage themselves from the latter in different positions of the carrier elements so that, particularly in the case of different flouring, the required end position cannot be maintained to the required extent.

This unimportant disadvantage is eliminated in the case of the second form of embodiment of the invention.

In accordance with this second form of embodiment of the invention, the releasing device has, in an advantageous manner, a control guide for taking up a sliding or rolling member which is connected to the carrier element, which member is constructed to swivel up and down for carrying out a tilting movement of the carrier elements. The carrier elements have, according to this embodiment, in an extension of their longitudinal central axis, on both ends, a pin which is rigidly connected to the carrier element and which is coupled to the endless conveyor, constructed as a chain, by means of connecting links. One pin of a carrier element on the sides of the carrier element, which are the same in each case, is rigidly connected to a swivel lever at the end of which there is arranged an axle running parallel to the longitudinal central axis of the carrier element, there on the side of which remote from the carrier element, is secured a sliding or roller member, which is supported slidingly or rollably in the control guide of the releasing device. According to this form of embodiment of the invention, the endless chain runs on a chain guide, which serves simultaneously as an abutment during the lowering of the control guide to produce a torque for the purpose of carrying out a swivelling movement of the carrier elements. Both the holding of the carrier elements and their support during the swivelling or tilting movement become extremely simple with this form of embodiment according to the invention.

The control guide of the carrier element may comprise, in an advantageous manner, a U-shaped rail which is made to move up and down by means of eccentric discs with the help of a plurality of rods. However, the drive can also be effected by means of pneumatically or hydraulically driven rods. The stroke height of the control guide and the swivelling angle of the carrier element may be variable. For this purpose there may be provided in each eccentric disc an oblong hole through which an adjustable entrainment means for the rods, which can be varied in length, is guided. By these features it is possible, in a single manner, to variably fix the swivelling or tilting angle of the carrier element. The tilting angle can thus be adapted to the requirements of the pieces of dough to be processed.

The equipment according to the invention can be suitable for processing different weights of pieces of dough with differing dough consistency. However, with this, the adhesion of the pieces of dough to the carrier element is also different, whereby a different "angle of repose" results. By "angle of repose" is understood here the angle with respect to the horizontal at which a corresponding piece of dough begins to slide down from its carrying surface. Since the total movement course of the releasing device is compulsorily controlled, it is possible to carry out the swivelling movement of the carrier elements with such a speed that all the pieces of dough fall down unifrmly from their carrier element. When this is achieved, a rearrangement of the pieces of dough which are correct with respect to their own position is attained so that the latter arrive from the transport device into a similarly correct position on to the fermented material carrier, which then again ejects this similarly correctly on to the hearth surface of the baking oven.

In a further form of the invention, there is located in the movement direction of the endless conveyor, in front of the releasing device, a stationary control guide, which has an input guide, so that the carrier elements arrive horizontally directed in the stationary control guide. With this, the transport or carrier elements have a stable horizontal position, particularly if these carrier elements pass through filling stations and are charged with pieces of dough. Even if the pieces of dough do not fall centrally on to the carrier element, the carrier element does not carry out any oscillations or tilting movements. The endless conveyor can thus be actuated in a stepwise manner, since all the carrier elements are held almost free from tilting and oscillation and are swivelled compulsorily only in the releasing device at a predetermined time, the whole cycle belt movement being compulsorily controlled.

Outside the stationary control guide and the releasing device, on the other hand, the transport or carrier elements can swing freely so that dough or flour residues can be easily removed from the carrier element.

The transport device according to various aspects of the invention thus makes possible a fully automatic emptying of the transport or carrier elements and a filling of the fermented material carriers located thereunder, the pieces of dough on transfer occupying a defined position independently of the dough consistency and of the weight of the pieces of dough. The form of the end sequence is in this case optional, according to the charging device used. This is necessary, so that the roll joints or junctions of the pieces of dough in the baking oven comes to lie in each case facing upwards.

The releasing device is driven, in a preferred form of embodiment, by an electric motor through lifting rods and eccentric discs. The electric motor is actuable at certain times in dependence on the operating speed of the dough dividing and circular kneading device. The drive of the eccentric disc is released in an advantageous manner by certain transport or carrier elements by means of correspondingly arranged actuating elements. With this it is ensured that a transfer of the pieces of dough is effected by the carrier elements on to the fermented material carriers only if the transport elements have assumed their correct position with respect to the fermented material carriers located thereunder.

In a further development of the invention, a feed magazine for emptying charging or fermented material carriers is non-positively coupled to an automatically operating call up device, in such a manner that in each case an empty charging or fermented material carrier can be introduced under the upper run of the horizontally running endless conveyor. This call up device is coupled to a further transport mechanism, by which charging or fermented material carriers, filled with pieces of dough, can be delivered to a removal magazine. The feed magazine and, if necessary, also the removal magazine, can be constructed to be movable.

Thus, for the device according to various aspects of the invention, only a minimum of operators is necessary, who merely have the task of supervising the operation of the device and keeping empty fermented material carriers ready in a feed magazine and of coupling, in a non-positive manner, the latter to the transport device of the equipment. The operators have accordingly to take care that the full removal magazines are removed from the plant at the correct time.

BRIEF DESCRIPTION OF THE DRAWINGS

Several embodiments of the invention will now be described by way of example with reference to the drawings, in which:

FIG. 1 shows a cross-section through the entire equipment of the combined dough dividing and circular kneading device with a transport device according to the invention;

FIG. 2 shows a cross-section through a part of the transport device;

DESCRIPTION OF THE PREFERRED EMBODIMENTS

Figure 3:
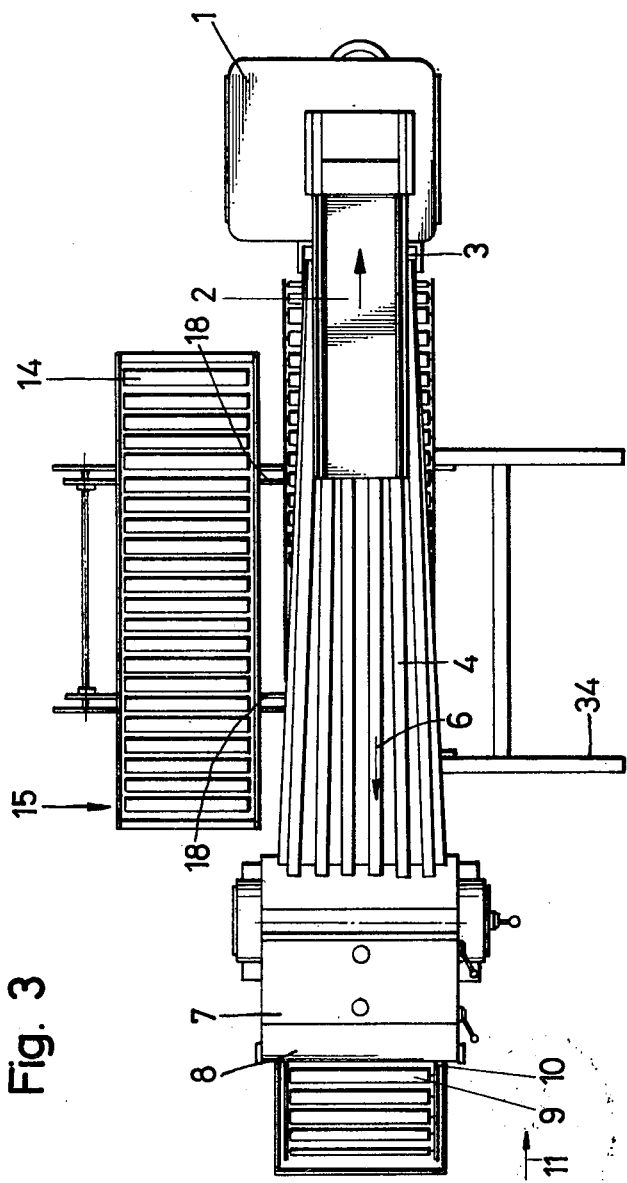
FIG. 3 shows a plan view of the device shown in FIG. 1.

In FIG. 1, 1 designates a dough dividing and circular kneading device, which has a dough feed 2 which preferably comprises a conveyor belt. The divided and circularly kneaded piece of dough leave the dough dividing and circular kneading device 1 by the dough part delivery 3 and arrive from there on a spreading coneyor belt 4. The pieces of dough 5 move in the direction of the arrow 6 to the rolling-out station 7. The pieces of dough rolled out and folded here leave the rolling-out station 7 by the dough piece delivery 8 and fall on to the carrier elements 9 located thereunder which will be described in more detail later with reference to FIG. 2. The carrier elements 9 secured to an endless conveyor 10 are moved periodically (or stepwise with a step length which extends from the center of one carrier element to the center line of the following carrier element) in the direction of the arrow 11 and reach a position above an empty fermented material carrier 12 which is also for example equipped with rocker troughs 14 (see FIG. 3 for this), and which was introduced previously by a magazine 15 into the region between the upper and lower runs of the endless conveyor 10. The introduction of a fermented material carrier 12 from the magazine 15, which is filled with empty fermented material carriers 12, is effected with the help of the drive 16, which acts through a shaft 17 on a pair of chains 18 which are provided with entrainment means. This mechanism will be described in more detail later on with reference to FIGS. 7 and 8.

In the following, a first exemplary embodiment of the transport device according to the invention is described in detail with reference to FIG. 2.

The endless conveyor 10 in this case comprises two synchronously rotating belts or chains, arranged parallel of which only one is visible in FIG. 2, whereas the other is located in a plane which is parallel to the drawing. Carrier elements 9, which are parallel with each other, are arranged on the endless holder 10. The transport or carrier elements 9 are provided with a concavely arched or trough-shaped upper surface 19 for the accommodation of pieces of dough. The transport or carrier elements 9 are constructed as tilting troughs and are swingably or tiltably supported about a longitudinal axis 20 (which is perpendicular to the plane of the drawing) in the direction of the arrow 21, as is clear from the carrier element 22 hanging down and shown in broken lines. To support and carry out this swinging or swivel movement an axle 23, which is parallel to the swivel axis 20, is provided with a controlled guide which, for example, comprises rollers 24, which are secured to the ends of the axle 23 and which run, in the upper run of the endless conveyor 10, in or on a pair of rails 25. Here too again, only one rail 25 of the pair of rails is visible, since the second rail lies parallel thereto. In the region above the charging or fermented material carrier 12, a part 26 of the pair of rails 25 (from $26_1$ to $26_2$) is constructed to be automatically lowered and raised again at predetermined times. The lowering and raising movement of the rail section 26 is effected through the rods 27 and 28, which, in each case, are actuated by an eccentric disc 29 or 30. The eccentric discs 29 and 30 are, in turn, non-positively connected through a transmission 31 to a drive 32. The actuation of the drive 32 can be effected, for example, with the help of switching means, such as light barriers, pressure switches or micro-switches, which are not shown in any more detail and which are switched by a certain carrier element, for example the carrier element 33, and then only if, in the full state, it has taken up the position at $26_2$ shown in FIG. 2.

The part of this transport device, shown in particular in FIG. 2, according to the invention, now operates in the following manner. The carrier elements 9 filled with pieces of dough move in the operating rhythm of the machine, i.e. either continuously or stepwise in the direction of the arrow 11. If the first filled carrier element 33 has reached the last position in the lowering region 26 (at $26_2$) of the pair of rails 25, this carrier element 33 actuates a switch (not shown in any detail) which causes a circuit for supplying the electric motor 32 to be closed. Hereupon the motor 32 begins to operate, and rotates the eccentric discs 29 and 30 with the help of the transmission 31, by which the rods 27 and 28 lower the rail region 26 (from $26_1$ to $26_2$). Since each axis 20 is secured to the endless conveyor and remains in the transport plane shown in FIG. 2, whereas the pair of rails 26 drops, all the carriers elements located on the pair of rails 26 are brought into the pivoted or hanging down position indicated by the carrier element 22, so that the pieces of dough lying on the carrier elements fall down and arrive on to the rocker trough 14 of an empty fermented material carrier 12 lying therebelow (not shown in any detail in FIG. 2). By a further rotation of the eccentric discs 29 and 30, the rods 27 and 28 and thus the rail region 26 (from $26_1$ to $26_2$) are then raised again so that all the carrier elements again take up their original horizontal position. Then, by means of switching means (not shown in any detail) the drive for the endless holder 10 is set into operation, until a filled carrier element has again taken up the position at $26_2$, represented by the carrier element 33, after which the above-described operation is repeated. In the meantime, however, the filled fermented material carrier 12 is moved out of the region of the endless conveyor 10 and arrives at a removal magazine 34, whereas simultaneously a new empty fermented material carrier 12 is simultaneously introduced from the feed magazine 15 into the region of the endless conveyor 10.

Figure 4:
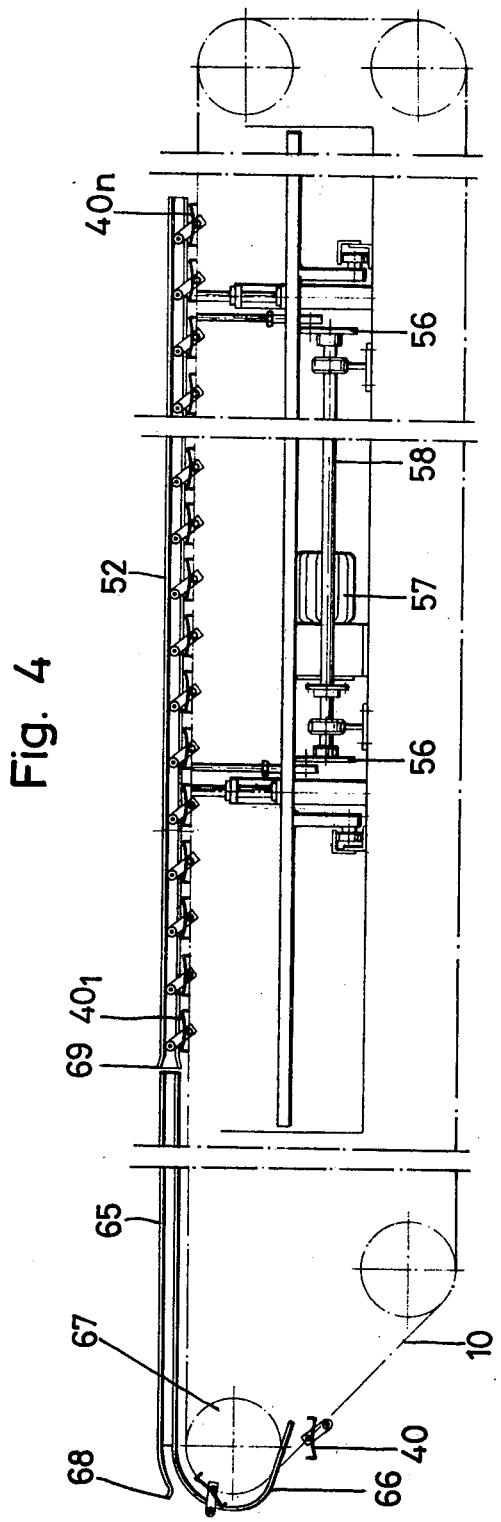
FIG. 4 shows schematically a cross section through one part of the transport device of the combined dough dividing and circular kneading device of a further embodiment.

FIG. 4 shows a further exemplary embodiment of a transport device according to the invention. Carrier elements 40, $40_1$ . . . $40_n$, which are parallel to each other, are secured to the endless conveyor 10. The transport or carrier elements are constructed the same as each other, so that in what follows the carrier element 40 is described in more detail. For accommodating the pieces of dough, the carrier element 40 is also provided with a concavely arched or trough-shaped upper surface 41 (see FIG. 5 for this). The carrier elements 40 are secured to a longitudinal center axis 42, for example by welding, and at both ends of each longitudinal centre axis 42 there is a pin 43 which is rigidly connected to the carrier element 40 (for this see FIG. 6, in which only one pin 43 is shown, whereas the carrier element 40 is broken away, so that the pin located on the righthand side of the carrier element is not shown). The pin 43 is articulatedly coupled through connecting links 44, 45 to the endless conveyor 10 constructed as a chain 46. The chain members of the chain 46 are located on a chain guide 47, which is firmly connected to the housing and has a guide rail 48. At the sides of the carrier elements, which are the same in each case, a swivelling lever 49 is rigidly secured to the pin 43, the longitudinal axis of which swivelling lever forms an angle of about 45° to the normal of the carrier element surface to achieve a maximal torque. An axle 50, which runs parallel to the longitudinal center axis 42 of the carrier element 40 and to the side of which remote from the carrier element is secured a sliding or rolling member 51, passes through the end of the swivelling lever 49. This sliding or rolling member 51 is slidably or rollably supported in a U-shaped rail 52 of a center guide of the releasing device. The control guide, comprising the U-shaped rail 52, can be moved upwards and downwards with the help of a rod 53 to 55 through at least one eccentric disc 56, which is driven by a motor 57 by means of a shaft 58. For these reasons the upper part 53 of the rod is swivellably supported at 59. The lift height of the control guide constructed as the U-shaped rail 52 and thus the tilting angle of the carrier element 40 is made to be variable. In order to make this possible, the rods 53, 54, and 55 are constructed as telescopic screw rods and at the lower end of the rod 55 there is an entrainment means 60 which is adjustably supported in an oblong hole 61. Sliding rods 62 are provided for guiding the releasing device during the upwards and downwards movement which rods 62, at the lower end, have a sliding piston 63, which is slidably supported in a sleeve or casing 64.

In the direction of travel of the endless conveyor 10 in front of the raisable and lowerable rail 52 of the releasing device there is a stationary control guide 65, which has an intake guide 66 so that the carrier elements 40 arrive in the stationary control guide directed horizontally. The sliding or rolling members 51 are in this case engaged by the intake guide 66, which is constructed in such a manner that it intersects, with its inlet position, the line of the sliding or rolling member 51 at an acute angle. The sliding or rolling members 51 are engaged hereby, and are guided round the guide wheel 67 of the chain guide of the endless conveyor 10, and in so doing are engaged by an intake lug 68 and delivered to the stationary control guide 65, which likewise is constructed as a U-shaped rail. In order to make possible the transition of the sliding or rolling member 51, from the stationary control guide 65 to the rail 52 which can be moved upwards or downwards, without the members jamming, the U-shaped rail 52 is likewise equipped with an intake lug 69.

Figure 5:
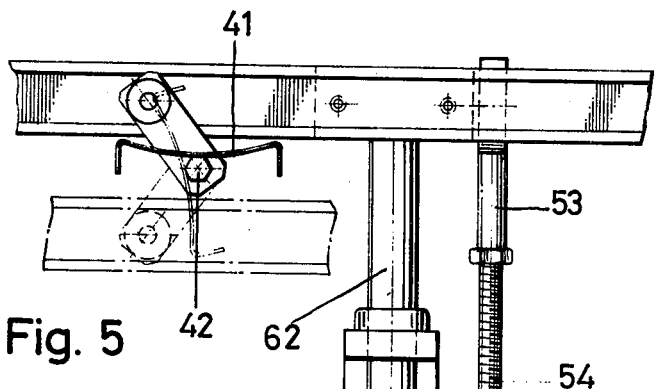
FIG. 5 shows an enlarged cross-section of the lifting rod of the release device according to the form of embodiment shown in FIG. 4.
Figure 6:
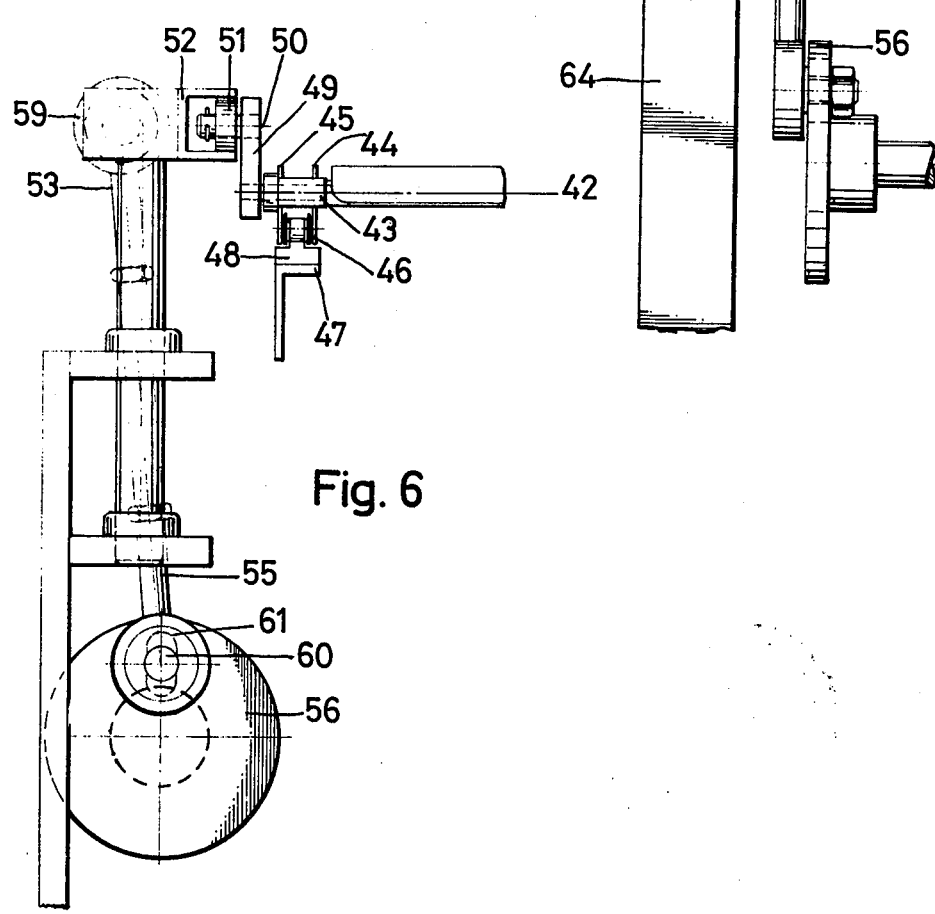
FIG. 6 shows a section of the lifting device according to FIG. 5 perpendicular to the plane of the drawing.

This second exemplary embodiment of the invention shown in FIGS. 4, 5 and 6, works in a similar manner to the first exemplary embodiment. The carrier elements 40 are charged with pieces of dough in the region of the stationary control guide 65 and move in the operating rhythm of the machine i.e. either continuously or stepwise, in the direction of the lowerable rail 52. If the first full carrier element $40_n$ has reached the last position in the lowering region of the rail 52, this carrier element $40_n$ actuates a switch (not shown in any detail) which causes closing of a circuit for supplying the electric motor 57. Hereupon, the motor 57 begins to operate and rotates the eccentric disc 56, upon which, the rods 53, 54 and 55 lower the rail 52. By this, all the sliding or rolling members 51 located in the U-shaped rail 52 are guided downwards and in so doing exert, over the swivelling lever 49, about the longitudinal center 42, a force which, because of the resistance effected by the chain guide 47, effects a torque about the axis 42. Since the carrier element 40 is rigidly connected to the longitudinal centre axis 42, the carrier element executes a swivelling movement which is shown with a broken line in FIG. 5. The angle of swivel of the upper surface 41 can, in this case, be made to be variable by varying the lift height of the rods 53, 54 and 55.

Thus the whole movement course of the carrier element is compulsorily controlled by the control guide and the swivelling movement of the carrier element guide in the lowerable part of the U-shaped rail 52 is not subjected to any unforeseen difficulties.

The fermented material carriers 12 shown in FIG. 1 are located below the lowerable rail 52, and are charged with pieces of dough during the swivelling or tilting movement of the carrier elements 40. The time for the whole tilting or swivelling operation of the carrier elements 40 is smaller than the time which a carrier element requires to travel the path spacing between two carrier elements. With this it is ensured that the charging operation of the rocker troughs can take place with continuous movement of the entire plant. The movement course of the endless conveyor can, in this case, be effected continuously or in steps. The whole plant with the transport device thus operates independently of the operation rhythm of an operator, so that all the components of the equipment can be maximally exploited. In the case of the device as described above, the rocker trough apparatus, or tilting carriers or even fermented material carriers, can be used in the conventional sizes in the device according to the invention, so that a continuous operating cycle is ensured by this.

A further advantage in the case of the transport device as described above results from the fact that the carrier element secured to the endless conveyor can run through an air-treatment chamber (not shown in any detail) during its return guide to the stationary control guide 65. The air-treatment chamber, as in the case of the first exemplary embodiment, serves for the aeration, drying and cleaning of carrier elements. For this purpose a heating means and also a fan can be provided in the airtreatment chamber.

The following data are based on a exemplary embodiment of the invention which has been produced:

If, for example, pieces of dough with a weight range of 30 to 65 grammes arrive for processing, the speed of the accentric discs is advantageously in a range from 100 to 140 revolutions per minute. The angle of tilt of the carrier elements with respect to the horizontal in this case preferably amounts to 100 to 110 degrees.

Figure 7:
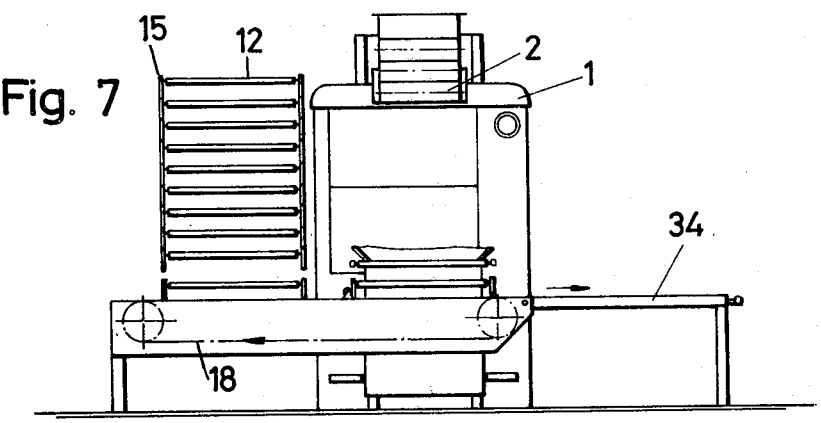
FIG. 7 shows a section A–B according to FIG. 1.
Figure 8:
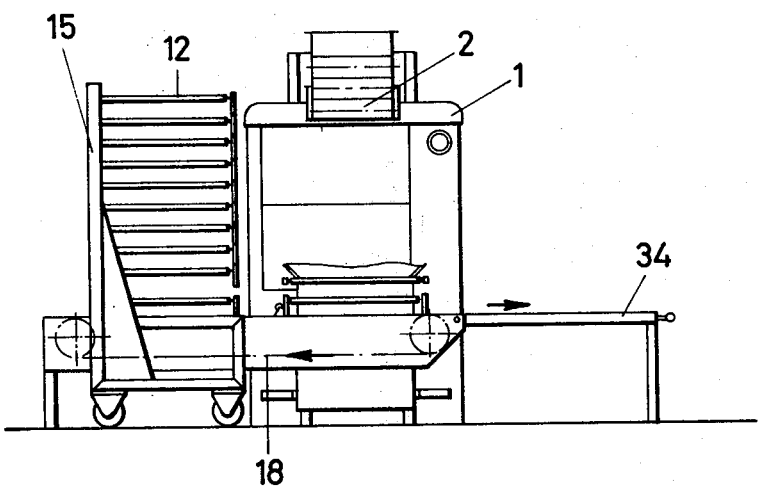
FIG. 8 shows another exemplary embodiment of the invention drawn similar to FIG. 7.

The feed and removal magazines and their spatial arrangement with respect to the dough divider and circular kneading device with rolling-out station can be clearly seen from FIGS. 3, 7 and 8.

In the case of the form of embodiment according to FIG. 7, the feed magazine 15 of the dough dividing and circular kneading device 1 is closely associated with rolling out station 7. The individual fermented material carriers 12 are, in this case, guided in the empty state to the magazine 15 and pass through the magazine downwards, whereas the lowermost fermented material carrier is moved into the region of the endless conveyor with the help of the pair of chains 18 at certain time intervals. The pair of chains 18 provided with entrainment means is, in this case, driven through a shaft 17 by the motor 16 (see FIG. 1 for this), which also can serve to deliver a filled fermented material carrier 12 to the removal magazine 34. The removal magazine 34 can be constructed as a take-off table in the simplest manner. However, a removal magazine can be used which is constructed like the feed magazine 15, in which the filled fermented material carriers move from above downwards until the entire magazine is full and can be transported to a fermentation chamber or to the baking oven.

FIG. 8 shows another form of embodiment of the feed magazine 15. In this case the magazine 15 comprises a movable frame, which is constructed in the lower part in such a manner that it can be moved over the pair of chains 18. A locking device (not shown in any more detail) provides that the feed magazine 15 assumes the correct operational position and remains in the latter during the working operation. The removal magazine 34 can, in this case, be constructed similarly to the feed magazine 15 just described. The form of embodiment of this magazine is particularly advantageous since the magazine can be moved in the empty or filled state to the corresponding further working stations, such as e.g., a fermentation cabinet or oven.

Thus, there is created with the device as described above equipment which is very compactly constructed so that it can be accommodated in the conventional bakeries and which can be operated by a single operator.

What I claim is:

1. A transport device, for use with a dough dividing and circular kneading device, a dough rolling-out station spaced from the dividing and kneading device, and means carrying kneaded dough pieces from the dividing and kneading device to the rolling-out station, said transport device comprising, in combination, an endless conveyor extending between said station and said kneading device; carrier elements on said conveyor, tiltable about respective pivot axes spaced longitudinally of said conveyor and extending transversely of the direction of movement of said conveyor, arranged to receive rolled-out dough pieces at said rolling-out station; control guide means operatively engaged with said carrier elements and normally maintaining the latter in dough-piece receiving orientation, a portion of said control guide means being displaceable vertically, while remaining engaged with said carrier elements, to tilt said carrier elements to discharge the rolled-out dough pieces onto a carrier and to return said carrier elements to their dough-piece receiving orientation; and release means operable, each time a selected number of filled carrier elements is aligned with a carrier to displace said control guide means portion vertically to so tilt said selected number of filled carrier elements simultaneously to discharge the dough-pieces therefrom and to return said selected number of carrier elements to their dough-piece receiving orientation.

2. A transport device, as claimed in claim 1, wherein said endless conveyor comprises two synchronously-moving endless elements; and respective guiding elements on each carrier element engaged with said guide means.

3. A transport device as claimed in claim 1, wherein the release means acts on the number of transport or carrier elements which corresponds to the number of carrying elements or positions of the carrier.

4. A transport device, as claimed in claim 1, wherein each carrier element has pins at the opposite ends of its pivot axis, said pins being fixedly connected to the associated carrier element; means connecting said pins to said endless conveyor; a respective swivel lever fixedly connected to one pin of each carrier element; a respective axle secured to each swivel lever and spaced from and parallel to the pivot axis of the associated carrier element; and a respective member secured to the free end of each swivel lever and supported in said control guide means.

5. A transport device as claimed in claim 1, wherein each carrier element carries a member on which is guided by the guide means.

6. A transport device as claimed in claim 2, wherein the carrier elements have pins at both ends of their pivot axes rigidly connected to the carrier elements and coupled to the endless conveyor by means of connecting links.

7. A transport device, as claimed in claim 1, wherein said control guide means includes a stationary portion arranged in advance of said movable portion, considered in the direction of movement of the endless conveyor; said stationary portion having an intake part contoured to guide said carrier elements into said stationary portion in a horizontal orientation.

8. A transport device as claimed in claim 1, wherein the endless conveyor runs on a conveyor guide which acts as an abutment during movement of the control guide means to enable the production of a torque for carrying out the swivelling movement of the carrier elements.

9. A transport device as claimed in claim 1, wherein the movable portion of the control guide means comprises a U-shaped rail which is movable by means of eccentric discs through intermediate rods.

10. A transport device, as claimed in claim 9, in which said intermediate rod include adjustment means operable to adjust the distance through which said movable portion of said control guide means is vertically movable, and thus to adjust the magnitude of the angular movement of said carrier elements.

11. A transport device, as claimed in claim 10, wherein each eccentric disc is formed with an elongated aperture; respective entrainment means adjustably engaged in each aperture and each connected to a respective rod; and means operable to adjust the length of each rod.

12. A transport device as claimed in claim 1, wherein an air treatment chamber is provided through which the lower run of the endless conveyor passes so that the carrier elements can be subjected to air cleaning and drying.

13. A transport device as claimed in claim 9, wherein, for processing dough pieces in a weight range of 30 to 65 grammes, the speed of the eccentric discs is in the range of 100 to 140 r.p.m. and the swivelling angle of the carrier elements is in the range 100 to 110 degrees with respect to the horizontal.

* * * * *